United States Patent
Dong et al.

(10) Patent No.: US 10,146,447 B1
(45) Date of Patent: Dec. 4, 2018

(54) MAPPED RAID (REDUNDANT ARRAY OF INDEPENDENT DISKS) IN A DATA STORAGE SYSTEM WITH DRIVE EXTENTS ALLOCATED TO INDIVIDUAL RAID EXTENTS FROM INDIVIDUAL SUB-GROUPS OF STORAGE MADE UP OF RANGES OF LOGICAL BLOCK ADDRESSES DEFINED ACROSS A GROUP OF HARD DISK DRIVES

(71) Applicant: EMC IP Holding Company LLC, Hopkinton, MA (US)

(72) Inventors: Jibing Dong, Beijing (CN); Jian Gao, Beijing (CN); Michael Wahl, Bulverde, TX (US); Geng Han, Beijing (CN); Xinlei Xu, Beijing (CN); Jamin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/662,720

(22) Filed: Jul. 28, 2017

(51) Int. Cl.
  *G06F 12/00* (2006.01)
  *G06F 3/06* (2006.01)
  *G06F 11/10* (2006.01)
(52) U.S. Cl.
  CPC .......... *G06F 3/0613* (2013.01); *G06F 3/0665* (2013.01); *G06F 3/0689* (2013.01); *G06F 11/1076* (2013.01); *G06F 12/00* (2013.01)
(58) Field of Classification Search
  CPC ..... G06F 3/0613; G06F 11/1076; G06F 12/00
  USPC ........................................................ 711/114
  See application file for complete search history.

(56) References Cited

U.S. PATENT DOCUMENTS

| 5,579,475 A | 11/1996 | Blaum et al. |
| 6,567,889 B1 | 5/2003 | DeKoning et al. |
| 6,857,059 B2 | 2/2005 | Karpoff et al. |
| 7,409,625 B2 | 8/2008 | Corbett et al. |
| 8,463,992 B2 | 6/2013 | Kelton et al. |
| 2004/0260967 A1 | 12/2004 | Guha et al. |
| 2006/0075283 A1 | 4/2006 | Hartung et al. |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Jae U Yu
(74) *Attorney, Agent, or Firm* — BainwoodHuang

(57) ABSTRACT

Technology is provided within a mapped RAID (Redundant Array of Independent Disks) system for creating multiple storage sub-groups in a group of disk drives. Each one of the storage sub-groups contains, in each one of the hard disk drives in the group of hard disk drives, a contiguous set of blocks of storage located within a unique range of logical block addresses corresponding to the storage sub-group. Based on the storage sub-groups created by the disclosed technology, a unique corresponding set of drive extents is allocated to each one of the RAID extents in the RAID mapping table, such that all drive extents contained in each one of the sets of drive extents are allocated from within a single one of the storage sub-groups. Drive extents may be allocated such that a low level of variance is maintained within values of a neighborhood matrix for the group of disk drives.

15 Claims, 10 Drawing Sheets

(56) References Cited

U.S. PATENT DOCUMENTS

2008/0168224 A1* 7/2008 Davison ............. G06F 11/2058
   711/114
2012/0137065 A1 5/2012 Odenwald et al.

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

"Logical Block Addressing", DEW Associates Corporation, 1995-2002; <<http://www.dewassoc.com/kbase/hard_drives/lba.htm>>article was accessed on Sep. 6, 2017, 2 pages.

* cited by examiner

MAPPED RAID (REDUNDANT ARRAY OF INDEPENDENT DISKS) IN A DATA STORAGE SYSTEM WITH DRIVE EXTENTS ALLOCATED TO INDIVIDUAL RAID EXTENTS FROM INDIVIDUAL SUB-GROUPS OF STORAGE MADE UP OF RANGES OF LOGICAL BLOCK ADDRESSES DEFINED ACROSS A GROUP OF HARD DISK DRIVES

TECHNICAL FIELD

The present disclosure relates generally to intelligent data storage systems that provide RAID (Redundant Array of Independent Disks) technology, and more specifically to technology for providing mapped RAID with drive extents that are allocated to individual RAID extents in a RAID mapping table from within individual sub-groups of storage that are each made up of a range of logical block addresses defined across a group of hard disk drives.

BACKGROUND

Data storage systems are arrangements of hardware and software that typically include multiple storage processors coupled to arrays of non-volatile data storage devices, such as magnetic disk drives ("hard disk drives"). The storage processors service host I/O operations received from host machines. The received I/O operations specify one or more storage objects (e.g. logical disks or "LUNs") that are to be written, read, created, or deleted. The storage processors run software that manages incoming I/O operations and performs various data processing tasks to organize and secure the host data that is received from the host machines and stored on the non-volatile data storage devices.

Some existing data storage systems have provided traditional RAID (Redundant Array of Independent Disks) technology. As it is generally known, traditional RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks of an address space of a logical storage object), and then storing data written to consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, RAID-6 provides striping with double distributed parity information that is provided on a per-stripe basis. The double parity information maintained by RAID-6 enables data protection for up to a maximum of two concurrently failing drives.

SUMMARY

Data storage systems providing traditional RAID data protection have exhibited significant limitations with regard to the ability to add new disks, and with regard to the amount of time required to rebuild data onto a replacement disk in the event of a disk failure. Specifically, traditional RAID systems have not supported the addition of new disks on an individual disk basis, but have instead required that new storage capacity be added only in increments equal to the number of disks that is required to support the specific RAID configuration, i.e. equal to the width of the RAID stripe being used. Accordingly, for 4D+1P RAID-5 configurations, new disks could only be added to a traditional RAID system in increments of five disks at a time. For 4D+2P RAID-6 configurations, new disks could only be added to traditional RAID systems in increments of six disks. As the capacity of individual disks has increased over time with the introduction of new storage technologies, this inflexibility in terms of adding new capacity to traditional RAID systems has become increasingly burdensome and impractical.

Also as individual disk capacity has increased, the time required by traditional RAID systems to rebuild data of an entire failed disk onto a single spare disk has increased, and the write bandwidth of the single spare disk has become a significant performance bottleneck with regard to total rebuild time. Moreover, while data previously stored on the failed disk is being rebuilt on the spare disk, concurrent failure of one or more additional disks in a traditional RAID system during the rebuilding process may introduce the risk of data loss.

Mapped RAID technology improves on traditional RAID technology by allowing for the addition of individual storage drives to a data storage system in order to increase storage capacity, and also addresses the problem of increased rebuild times caused by write bandwidth bottlenecks in dedicated spare disks. In mapped RAID technology, physical data storage drives are divided into contiguous regions of non-volatile data storage referred to as "drive extents" that are allocated from a drive extent pool. A RAID mapping table organizes the allocated drive extents into "RAID extents" that indicate the allocated drive extents. Each RAID extent indicates a set of drive extents allocated from the drive extent pool, and each drive extent allocated to a given RAID extent may be located on a different physical drive. The drive extents indicated by a RAID extent are used to store the blocks of data and parity information for a stripe of data storage represented by the RAID extent. Accordingly, the number of drive extents indicated by each RAID extent may be the same as the number of disks used in a traditional RAID system to store data blocks and parity information for the same RAID level. For example, in a mapped RAID group supporting a 4D+1P RAID-5 configuration, each RAID extent indicates a total of five drive extents that are used to store the four blocks of data as well as the parity information block of the stripe represented by the RAID extent. In a 4D+2P RAID-6 configuration of mapped RAID, two parity information blocks are indicated by each RAID extent to provide an increased level of fault tolerance, and each RAID extent indicates a total of six drive extents.

In the event that a drive fails when using mapped RAID, spare drive extents can be allocated that are located on multiple physical drives contributing to the drive extent pool in order to replace the drive extents from the failed drive, thus spreading the rebuild read and write operations across multiple physical drives, and eliminating the write bandwidth bottleneck previously caused by traditional RAID's reliance on rebuilding to a single spare physical data storage drive. In this way, mapped RAID can generally reduce rebuild time in the face of a single drive failure. Moreover, as the number of physical data storage drives increases, the amount of concurrent processing that can be used during the rebuild process also increases, resulting in progressively improving rebuild performance for increasing numbers of physical data storage drives that are used to support a given RAID configuration.

Unfortunately, significant shortcomings may arise in mapped RAID implementations that allocate drive extents to RAID extents without regard to where individual drive extents are physically located on the underlying hard disks. As it is generally known, a hard disk drive is a non-volatile data storage device that uses magnetic storage to store and retrieve digital data using one or more rotating disks. The data stored on the surface of the rotating disk is recorded on circular paths across the disk known as physical "tracks". The data in each track is divided into blocks, which are each individually accessed based on a unique corresponding logical block address. Tracks that are located more towards the physical center of the disk have higher logical block addresses, and are considered to be more inwardly located tracks, while tracks located more towards the outer edge of the disk have lower logical block addresses, and are considered to be more outwardly located tracks. Tracks that are more inwardly located are physically smaller than tracks that are more outwardly located. Accordingly, tracks that are more inwardly located can store less data than tracks that are more outwardly located, and the larger, more outwardly located tracks allow for more data to be accessed without having to change tracks. As a result, the time required to access blocks of storage on a hard disk drive will be less when those blocks are located on more outwardly located tracks than when the blocks are located on more inwardly located tracks.

As a consequence of these physical characteristics of hard disk drives, individual drive extents allocated from a group of hard disk drives to a single RAID extent may have significantly different performance characteristics, depending on whether they are allocated from more outwardly located tracks, which have relatively higher performance (i.e. lower response time), or from more inwardly located tracks, which have relatively lower performance (i.e. higher response time). If drive extents having different performance characteristics are allowed to be allocated to a single RAID extent, performance of I/O operations (reads and/or writes) that use that RAID extent may be limited by the lowest performing drive extent allocated to that RAID extent. For example, performing a write I/O operation that writes host data to one drive extent indicated by a RAID extent also typically requires that updated parity information be written to another drive extent indicated by the same RAID extent. In a case where the drive extent that stores the host data written by the write I/O operation is allocated from one or more higher performing, more outwardly located tracks of a hard disk drive, and the drive extent that stores the parity information is allocated from one or more lower performing, more inwardly located tracks of another hard disk drive, the write I/O operation cannot be completed until after the writing of the updated parity information to the lower performing drive extent completes, even though the writing of the host data to the higher performing drive extent may have been completed significantly sooner. As a result, the overall performance for the write operation may be limited by the lower performing drive extent used to store the parity information, and the higher performance provided by the drive extent used to store the host data is wasted.

To address these and other shortcomings of previous systems, new technology is disclosed herein for providing RAID data protection for a storage object in a data storage system that includes a storage processor and a group of hard disk drives communicably coupled to the storage processor. In the disclosed technology, a RAID mapping table is generated that contains RAID extents. Each RAID extent contained in the RAID mapping table indicates a predetermined number of drive extents that are each used to persistently store host data written to the storage object. Each drive extent is a contiguous region of non-volatile data storage located on one of the hard disk drives in the group of hard disk drives. Multiple storage sub-groups are created in the group of disk drives. Each one of the storage sub-groups contains, in each one of the hard disk drives in the group of hard disk drives, a contiguous set of blocks of storage located within a unique range of logical block addresses corresponding to the sub-group. Based on the storage sub-groups created by the disclosed technology, a unique set of drive extents is allocated to each one of the RAID extents in the RAID mapping table, such that the drive extents contained in each set of drive extents that are allocated to a RAID extent are all allocated from within a single one of the storage sub-groups.

In some embodiments, each one of the RAID extents in the RAID mapping table indicates the same predetermined total number of drive extents. Allocating a unique set of drive extents to each one of the RAID extents in the RAID mapping table may include calculating a RAID mapping table sub-group size, such that the value of the RAID mapping table sub-group size has a value that is at least as large as the result of dividing i) a total number of hard disk drives contained in the group of hard disk drives, by ii) the number of drive extents indicated by each one of the RAID extents in the RAID mapping table.

In some embodiments, allocating a unique corresponding set of drive extents to each one of the RAID extents in the RAID mapping table may include dividing the RAID mapping table into multiple RAID mapping table sub-groups, such that each RAID mapping table sub-group is made up of a unique set of RAID extents that are located consecutively within the RAID mapping table, and such that each set of consecutively located RAID extents consists of a total number of RAID extents that is equal to the RAID mapping table sub-group size. Each RAID mapping table sub-group in the RAID mapping table may be assigned to a corresponding one of the storage sub-groups.

In some embodiments, creating the storage sub-groups may include calculating a storage sub-group size, wherein the storage sub-group size is equal to a multiple of a product of i) the RAID mapping table sub-group size, and ii) the total number of drive extents indicated by each one of the RAID extents in the RAID mapping table. Each storage sub-group may then contain a total number of drive extents that is equal to the storage sub-group size.

In some embodiments, allocating a unique corresponding set of drive extents to each one of the RAID extents in the RAID mapping table may include allocating higher performing drive extents from the group of hard disk drives before allocating lower performing drive extents from the group of hard disk drives by allocating drive extents from storage sub-groups having lower corresponding ranges of logical block addresses before allocating drive extents from storage sub-groups having higher corresponding ranges of logical block addresses.

In some embodiments, allocating a unique corresponding set of drive extents to each one of the RAID extents in the RAID mapping table may include allocating drive extents such that for each RAID mapping table sub-group no drive extent is allocated to any RAID extent contained in the RAID mapping table sub-group that is located on the same hard disk drive as any other drive extent allocated to any other RAID extent contained in the RAID mapping table sub-group.

In some embodiments, a unique corresponding set of drive extents may be allocated to each one of the RAID extents in the RAID mapping table at least in part by generating a neighborhood matrix for the group of hard disk drives. Each element in the neighborhood matrix for the group of hard disk drives corresponds to a pair of drives contained in the group of hard disk drives and stores a value equal to a total number of RAID extents in the RAID mapping table that indicate both i) at least one drive extent located on a first one of the drives in the pair of drives corresponding to the element, and ii) at least one drive extent located on a second one of the drives in the pair of drives corresponding to the element. In order to allocate each drive extent contained in the set of drive extents, the disclosed technology may then i) generate a list of candidate drives contained in the group of hard disk drives, wherein each one of the candidate drives has located thereon at least one free drive extent, ii) assign, to each one of the candidate drives, a variance weighting that is equal to a variance of the values of the elements in the neighborhood matrix for the group of hard disk drives resulting from modifying the neighborhood matrix to indicate that the drive extent was allocated from the candidate drive, iii) select one of the candidate drives having a lowest assigned variance weighting, and iv) allocate the drive extent from the candidate drive having the lowest assigned variance weighting.

Embodiments of the disclosed technology may provide significant advantages over previous technical solutions. By dividing the hard disk drives in a group of hard disk drives into the disclosed storage sub-groups, in which each storage sub-group contains the storage located at the same range of logical block addresses within each hard disk drive, the disclosed technology enables drive extents to be allocated to RAID extents in a RAID mapping table such that all drive extents allocated to a given individual RAID extent are allocated from the same storage sub-group. By allocating all drive extents for each individual RAID extent from within the same storage sub-group, the disclosed technology ensures that the performance provided by all of the drive extents allocated to any given RAID extent is significantly equal. As a consequence, lower performing drive extents will not limit the performance of operations involving multiple drive extents within a single RAID extent, such as the performance of a write operation that writes data to a first drive extent and also writes parity information to a second drive extent indicated by the same RAID extent. The higher performance provided by higher performing drive extents is accordingly contributed to the overall performance of the data storage system without limitation by lower performing drive extents allocated to the same RAID extents as the higher performing drive extents.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
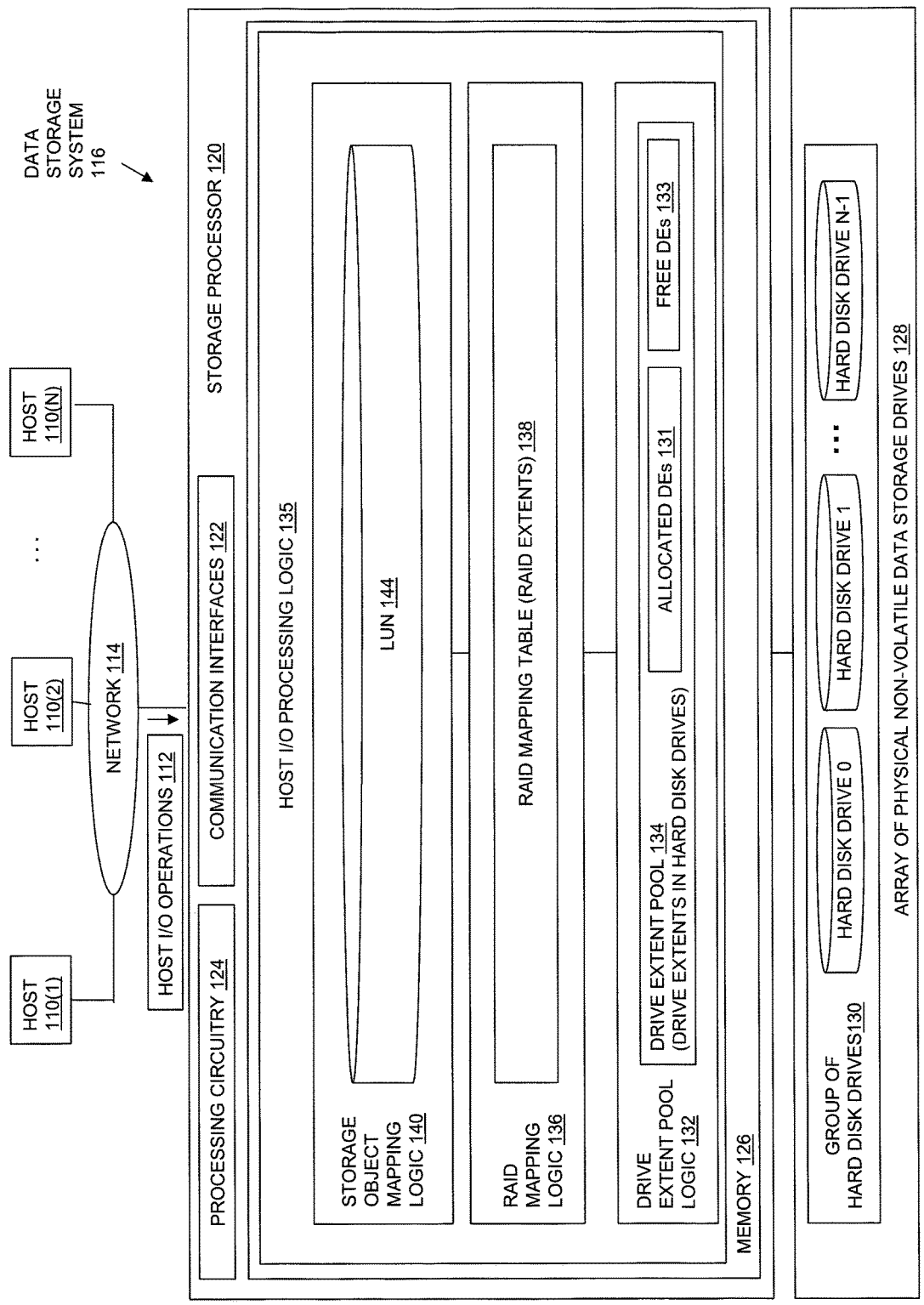
FIG. 1 is a block diagram showing an operational environment for some embodiments of the disclosed technology, including an example of a data storage system in which the disclosed technology may be embodied, with an example of a storage object, a RAID mapping table, a drive extent pool, and an underlying group of hard disk drives.

FIG. 1 is a block diagram showing an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Physical Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Physical Non-Volatile Data Storage Drives 128 may include hard disk drives such as magnetic disk drives. Array of Physical Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 initially generates Drive Extent Pool 134 by dividing each one of the hard disk drives in the Group of Hard Disk Drives 130 into multiple, equal size drive extents, each of which consists of physically contiguous non-volatile data storage located on a drive. For example, Drive Extent Pool Logic 132 may divide each one of the hard disk drives in the Group of Hard Disk Drives 130 into a fixed number of equal size drive extents of physically contiguous non-volatile storage, and add each one of the resulting drive extents to Drive Extent Pool 134. The drive extents in Drive Extent Pool 134 may each either be i) one of Allocated Drive Extents 131 that are allocated to a RAID extent in the RAID Mapping Table 138, or ii) one of Free Drive Extents 133 that are unallocated "spare" drive extents available for future allocation to RAID extents in RAID Mapping Table 138, e.g. to individual RAID extents in the RAID Mapping Table 138 to which drive extents have not yet been allocated, and/or in response to a failure condition, to replace, within RAID extents in the RAID Mapping Table 138, drive extents located on a failed drive in the Group of Hard Disk Drives 130.

The Group of Hard Disk Drives 130 from which Drive Extent Pool 134 is generated may consist of all the physical data storage drives in Array of Physical Non-Volatile Data Storage Drives 128, or only a subset of the physical data storage drives in Array of Physical Non-Volatile Data Storage Drives 128. Accordingly, the disclosed techniques may be embodied such that Array of Physical Non-Volatile Data Storage Drives 128 includes multiple separate groups of hard disk drives, each one of which may be used to independently generate a separate pool of drive extents.

The size of the drive extents into which the hard disk drives in the Group of Hard Disk Drives 130 are divided is the same for every hard disk drive in the Group of Hard Disk Drives 130. Various specific sizes of drive extents may be used in different embodiments. For example, in some embodiments each drive extent may have a size of 10 gigabytes. Larger or smaller drive extent sizes may be used in the alternative. Any specific number of physical data storage drives may be contained in the Group of Hard Disk Drives 130 and divided into equal size drive extents to generate Drive Extent Pool 134. The physical data storage drives in the Group of Hard Disk Drives 130 may each have the same total capacity, and may accordingly each be divided into the same number of drive extents. Alternatively, the hard disk drives in Group of Hard Disk Drives 130 may have a variety of different capacities, resulting in different physical data storage drives being divided into different numbers of equal size drive extents.

After dividing each one of the hard disk drives in the Group of Hard Disk Drives 130 into multiple, equal size drive extents of physically contiguous non-volatile data storage, and adding the resulting drive extents to Drive Extent Pool 134, drive extents are allocated to specific RAID extents contained in RAID Mapping Table 138, to be used to store host data directed to the RAID extents to which they are allocated. For example, individual drive extents may be allocated from Drive Extent Pool 134 to a specific individual RAID extent contained in RAID Mapping Table 138 in response to one or more allocation requests from RAID Mapping Logic 136, and then used to store host data that is directed to LUN 144 and mapped to that specific RAID extent. In some embodiments, drive extents are allocated to RAID extents in the RAID Mapping Table 138, such that no two drive extents indicated by any single RAID extent are located on the same hard disk drive.

In some embodiments, RAID Mapping Logic 136 creates multiple storage sub-groups in the Group of Hard Disk Drives 130. Each one of the storage sub-groups created by RAID Mapping Logic 136 contains, in each one of the hard disk drives in the Group of Hard Disk Drives 130, a contiguous set of blocks of storage located within a unique range of logical block addresses corresponding to the sub-group. Based on the storage sub-groups it creates, RAID Mapping Logic 136 allocates, from Drive Extent Pool 134, a unique corresponding set of drive extents to each one of the RAID extents contained in the RAID Mapping Table 138, such that the drive extents contained in each set of drive extents that are allocated to a RAID extent contained in RAID Mapping Table 138 are all allocated from within a single one of the storage sub-groups created by RAID Mapping Logic 136.

When a drive extent is allocated to a RAID extent, an indication of the drive extent is stored in the RAID extent. For example, a drive extent allocated to a RAID extent may be indicated within that RAID extent using a pair of indexes "m|n", in which "m" indicates a drive index of the physical data storage drive on which the drive extent is located (e.g. a numeric drive number within Array of Physical Non-Volatile Data Storage Drives 128, a slot number within which the physical drive located, or a textual drive name, etc.), and "n" indicates an index of the drive extent within the physical data storage drive (e.g. a numeric drive extent number, a block offset, a sector number, etc.). For example, in embodiments in which physical data storage drives are indexed within Array of Physical Non-Volatile Data Storage Drives 128 starting with 0, and in which drive extents are indexed within the hard disk drive that contains them starting with 0, a first drive extent of a first hard disk drive within Array of Physical Non-Volatile Data Storage Drives 128 may be represented by "0|0", a second drive extent within the first hard disk drive within Array of Physical Non-Volatile Data Storage Drives 128 may be represented by "0|1", and so on.

Each RAID extent in the RAID Mapping Table 138 indicates the same predetermined total number of drive extents. For example, in some embodiments configured to provide 4D+1P RAID-5 protection for LUN 144, each RAID extent in the RAID Mapping Table 138 may represent a single data stripe by indicating five drive extents, where each of the five drive extents is located on a different hard disk drive, and where four of the drive extents are used to store host data written to LUN 144 and one of the drive extents is used to store parity information. In order to provide drive diversity with regard to spare drive extents, the minimum number of physical drives (e.g. in Group of Hard Disk Drives 130), that is required to provide 4D+1P RAID-5 protection for LUN 144 must be greater than five, i.e. six or more. In another example, in some embodiments configured to provide 4D+2P RAID-6 protection for LUN 144, each RAID extent in the RAID Mapping Table 138 may represent a single data stripe by indicating six drive extents, where each of the six drive extents is located on a different hard disk drive, and where four of the drive extents are used to store host data written to LUN 144 and two of the drive extents are used to store parity information. In order to provide drive diversity with regard to providing spare drive extents, the minimum number of hard disk drives (e.g. in Group of Hard Disk Drives 130), that is required to provide 4D+2P RAID-6 protection for LUN 144 must be greater than six, i.e. seven or more. In either of these examples, the minimum number of physical drives required to provide RAID data protection for LUN 144 may be greater than the number of drive extents indicated by each RAID extent in the RAID Mapping Table 138. In some embodiments, the maximum drive group size may be at least twice as large as the minimum number of hard disk drives required to provide RAID data protection for LUN 144.

In some embodiments, the RAID Mapping Logic 136 allocates a unique corresponding set of drive extents from Drive Extent Pool 134 to each one of the RAID extents in the RAID mapping table at least in part by calculating a RAID mapping table sub-group size. The RAID mapping table sub-group size calculated by RAID Mapping Logic 136 may, for example, have a value that is at least as large as the result of dividing i) a total number of hard disk drives contained in the Group of Hard Disk Drives 130, by ii) the total number of drive extents indicated by each one of the RAID extents contained in the RAID Mapping Table 138. The division of the number of hard disk drives in Group of Hard Disk Drives 130 by the total number of drives extents indicated by each RAID extent may be an integer division, in which any fractional part (remainder) is discarded.

In some embodiments, RAID Mapping Logic 136 allocates a unique corresponding set of drive extents from Drive Extent Pool 134 to each one of the RAID extents in the RAID Mapping Table 138 at least in part by dividing RAID Mapping Table 138 into multiple RAID mapping table sub-groups. Each one of the RAID mapping table sub-groups created by RAID Mapping Logic 136 may consist of a unique set of consecutively located RAID extents in RAID Mapping Table 138. Each set of consecutively located RAID extents in a RAID mapping table sub-group created by RAID Mapping Logic 136 may consist of a total number of RAID extents that is equal to the RAID mapping table sub-group size calculated by RAID Mapping Logic 136. RAID Mapping Logic 136 may assign each RAID mapping table sub-group that is created in the RAID Mapping Table 138 to a corresponding one of the storage sub-groups.

In some embodiments, RAID Mapping Logic 136 may create the storage sub-groups at least in part by calculating a storage sub-group size, and then create each storage sub-group such that each storage sub-group contains a total number of drive extents that is equal to the calculated storage sub-group size. For example, RAID Mapping Logic 136 may calculate a storage sub-group size that is equal to a multiple of a product of i) the RAID mapping table sub-group size, and ii) the total predetermined number of drive extents indicated by each one of the RAID extents in the RAID mapping table. For example, RAID Mapping Logic 136 may calculate a storage sub-group size as follows:

storage_sub-group_size=m*(RAID_mapping_table_sub-group_size*total_drive_extents_per_RAID_extent)

where "*" indicates multiplication, and where "m" may be an integer configuration or setup value (e.g. 1, 2, 3, etc.) that is manually set at configuration time by a system administrator, or at development time by a code developer, e.g. in response to performance objectives and/or testing, and/or may be automatically determined at run time by program code based on automatically collected performance and/or resource utilization measurements or the like.

In some embodiments, RAID Mapping Logic 136 may allocate a unique corresponding set of drive extents to each one of the RAID extents in the RAID Mapping Table 138 at least in part by allocating higher performing drive extents from the Group of Hard Disk Drives 130 (e.g. out of Drive Extent Pool 134) before allocating lower performing drive extents from the Group of Hard Disk Drives 130 by allocating drive extents from storage sub-groups having lower corresponding ranges of logical block addresses before allocating drive extents from storage sub-groups having higher corresponding ranges of logical block addresses.

In some embodiments, RAID Mapping Logic 136 may allocate a unique corresponding set of drive extents to each one of the RAID extents in the RAID Mapping Table 138 at least in part by allocating drive extents such that for each RAID mapping table sub-group no drive extent is allocated to any RAID extent contained in the RAID mapping table sub-group that is located on the same hard disk drive in Group of Hard Disk Drives 130 as any other drive extent allocated to any other RAID extent contained in the same RAID mapping table sub-group.

In some embodiments, RAID Mapping Logic 136 may allocate a unique corresponding set of drive extents to each one of the RAID extents in the RAID Mapping Table 138 at least in part by generating a neighborhood matrix for the Group of Hard Disk Drives 130. Each element in the neighborhood matrix for the Group of Hard Disk Drives 130 corresponds to a pair of drives contained in the Group of Hard Disk Drives 130, and stores a value equal to a total number of RAID extents contained in the RAID Mapping Table 138 that each indicate both i) at least one drive extent located on a first one of the drives in the pair of drives corresponding to the matrix element, and ii) at least one drive extent located on a second one of the drives in the pair of drives corresponding to the matrix element. In order to allocate each drive extent contained in the set of drive extents for a RAID extent, the disclosed technology may then i) generate a list of candidate drives contained in the Group of Hard Disk Drives 130, where each one of the candidate drives has located thereon at least one free drive extent, ii) assign, to each one of the candidate drives, a variance weighting that is equal to a variance of the values of the elements in the neighborhood matrix for the Group of Hard Disk Drives 130 resulting from modifying the neighborhood matrix to indicate that the drive extent was allocated from the candidate drive, iii) select one of the candidate drives having a lowest assigned variance weighting, and iv) allocate the drive extent from the candidate drive having the lowest assigned variance weighting.

A drive extent may be released (i.e. deallocated) from a specific RAID extent back to Drive Extent Pool 134, and thereby made available for re-allocation to a different RAID extent, in response to a deallocation request or the like from RAID Mapping Logic 136, e.g. when the drive extent is no longer needed to store host data.

Host I/O Processing Logic 135 exposes one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 directs host data written to sets of consecutive blocks in a logical address space of LUN 144 to specific corresponding RAID extents in RAID Mapping Table 138, so that, for example, the host data written to a set of consecutive blocks in the logical address space of the LUN 144 can be persistently stored by drive extents indicated by the corresponding RAID extent, and so that parity information can be calculated and stored in at least one of the drive extents of the corresponding RAID extent to support data recovery. For example, an address space of LUN 144 may be made up of a set of sequential, equal size logical blocks of address space. Each host write I/O operation may indicate a specific block to be written within the address space of the LUN 144, e.g. using a logical block number (e.g. a logical block address) or offset into LUN 144. In some embodiments, 4D+1P RAID-5 block level striping with distributed parity error protection may be used, with each RAID stripe consisting of four data blocks and a block of parity information, and each RAID stripe being represented by a single RAID extent and mapped to the drive extents indicated by that RAID extent. In such embodiments, each RAID extent may indicate five drive extents. For each set of four consecutive blocks in the logical address space of LUN 144 that are mapped to a single RAID extent, host data may be striped across the drive extents indicated by that RAID extent by storing host data written to consecutive ones of the four consecutive blocks of the logical address space into different ones of four of the drive extents indicated by that RAID extent. Parity information may be calculated and stored in a fifth drive extent indicated by the RAID extent, e.g. as an XOR of the host data stored in the other four drive extents indicated by the RAID extent. In this way, host data stored in any one of the four drive extents indicated by the RAID extent that store host data can be recovered in the event of a failure of a physical data storage drive containing one of the four drive extents indicated by the RAID extent that store host data, for example by performing one or more XOR operations on the data stored in the three surviving drive extents indicated by the RAID extent that store host data, in combination with the parity information stored in the fifth drive extent indicated by the RAID extent.

Figure 2:
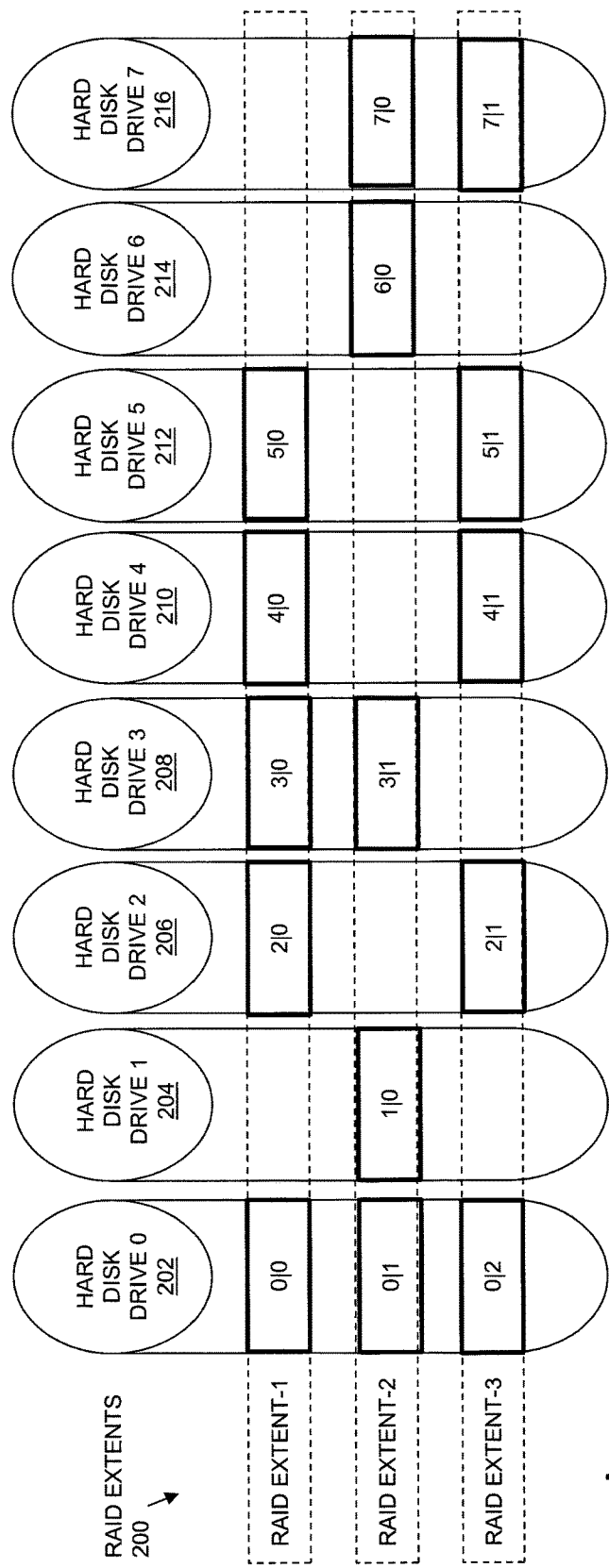
FIG. 2 is a block diagram showing an example of RAID extents in a RAID mapping table indicating drive extents located on hard disk drives in a group of hard disk drives in some embodiments.

FIG. 2 is a block diagram showing an illustrative example of RAID Extents 200, as may be contained in the RAID Mapping Table 138 in embodiments that provide 4D+1P RAID-5 striping and data protection. As shown in the example of FIG. 2, RAID Extents 200 include a first RAID Extent-1, a second RAID Extent-2, a third RAID Extent-3, and so on for some total number of RAID extents. In order to provide 4D+1P RAM-5, each RAID extent in RAID Extents 200 indicates a total of five drive extents.

RAID Extent-1 is shown for purposes of illustration indicating a first drive extent 0|0, which is the first drive extent in Hard Disk Drive 0 202, a second drive extent 2|0, which is the first drive extent in Hard Disk Drive 2 206, a third drive extent 3|0, which is the first drive extent in Hard Disk Drive 3 208, a fourth drive extent 4|0, which is the first drive extent in Hard Disk Drive 4 210, and a fifth drive extent 5|0, which is the first drive extent in Hard Disk Drive 5 212.

RAID Extent-2 is shown for purposes of illustration indicating a first drive extent 0|1, which is the second drive extent in Hard Disk Drive 0 202, a second drive extent 1|0, which is the first drive extent in Hard Disk Drive 1 204, a third drive extent 3|1, which is the second drive extent in Hard Disk Drive 3 208, a fourth drive extent 6|0, which is the first drive extent in Hard Disk Drive 6 214, and a fifth drive extent 7|0, which is the first drive extent in Hard Disk Drive 7 616.

RAID Extent-3 is shown for purposes of illustration indicating a first drive extent 0|2, which is the third drive extent in Hard Disk Drive 0 202, a second drive extent 2|1, which is the second drive extent in Hard Disk Drive 2 206, a third drive extent 4|1, which is the second drive extent in Hard Disk Drive 4 210, a fourth drive extent 5|1, which is the second drive extent in Hard Disk Drive 5 212, and a fifth drive extent 7|1, which is the second drive extent in Hard Disk Drive 7 216.

Figure 3:
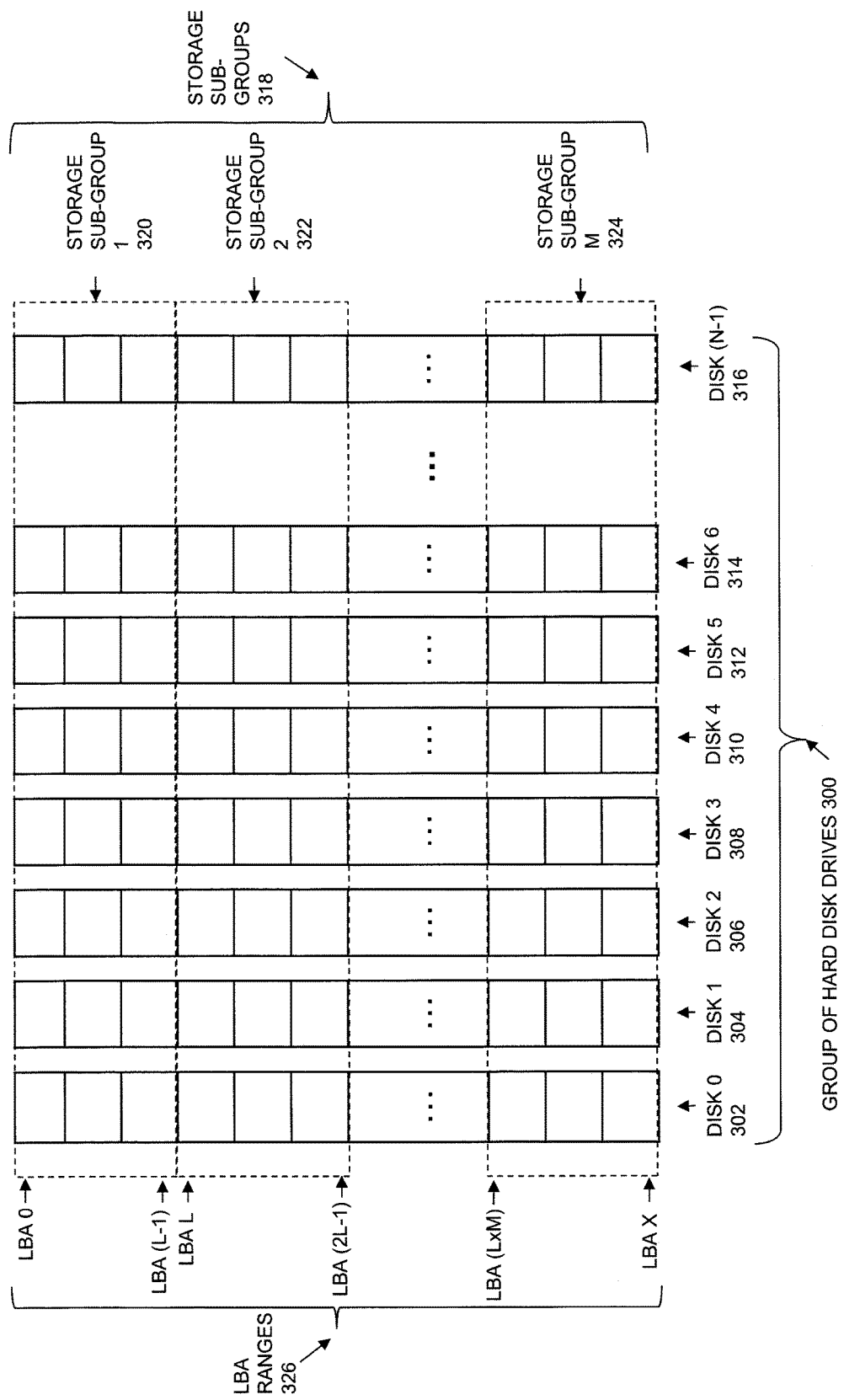
FIG. 3 is a block diagram showing an example of storage sub-groups created within a group of hard disk drives in some embodiments, and the corresponding ranges of logical block addresses for the storage sub-groups.

FIG. 3 is a block diagram showing an example of Storage Sub-Groups 318 as may be created by some embodiments within a Group of Hard Disk Drives 300. In the example of FIG. 3, the Group of Hard Disk Drives 300 includes N hard disk drives, shown by Disk 0 302, Disk 1 304, Disk 2 306, Disk 3 308, Disk 4 310, Disk 5 312, Disk 6 314, and so on through Disk N−1 316. Further in the example of FIG. 3, the Storage Sub-Groups 318 includes M individual storage sub-groups, including Storage Sub-Group 1 320, Storage Sub-Group 2 322, and so on through Storage Sub-Group M 324. Further in the example of FIG. 3, each one of the Storage Sub-Groups 318 contains a total of three drive extents on each one of the hard disk drives in the Group of Hard Disk Drives 300. Specifically, Storage Sub-Group 1 320 consists of three drive extents extending over the lowest range of logical block addresses on each one of the hard disk drives in the Group of Hard Disk Drives 300, Storage Sub-Group 2 322 consists of the three drive extents extending over the next lowest range of logical block addresses on each one of the hard disk drives in the Group of Hard Disk Drives 300, and so on through Storage Sub-Group M 324, which contains the three drive extents extending over the highest range of logical block addresses on each one of the hard disk drives in the Group of Hard Disk Drives 300. Accordingly, each one of the drive extents contained in Storage Sub-Group 1 320 is made up of blocks located on the outermost and highest performing tracks on the hard disk drives in the Group of Hard Disk Drives 300, each one of the drive extents contained in Storage Group 2 322 is made up of blocks located on the next outermost and next highest performing tracks on the hard disk drives in the Group of Hard Disk Drives 300, and so on through the drive extents contained in Storage Group M 324, each one of which is made up of blocks located on the innermost and lowest performing tracks on the hard disk drives in the Group of Hard Disk Drives 300. Since each one of the storage sub-groups in Storage Sub-Groups 318 contains three drive extents on each one of the hard disk drives in the Group of Hard Disk Drives 300, and the Group of Hard Disk Drives 300 contains N hard disk drives, the total number of drive extents contained in each individual one of the storage sub-groups in Storage Sub-Groups 318 is 3×N.

Each one of the Storage Sub-Groups 318 contains a contiguous set of blocks on each one of the hard disks in the Group of Hard Disks 300 that is located within a corresponding one of the unique LBA Ranges 326. In the example of FIG. 3, each one of the LBA Ranges 326 consists of L contiguous blocks of storage. Storage Sub-Group 1 320 is made up a contiguous set of blocks on each one of the hard disks in the Group of Hard Disks 300 that are located in the range of blocks from LBA 0 through LBA (L−1). Accordingly, Storage Sub-Group 1 320 includes the storage blocks from LBA 0 through LBA (L−1) on each one of Disk 0 302, Disk 1 304, Disk 2 306, Disk 3 308, Disk 4 310, Disk 5 312, Disk 6 314, and so on through Disk N−1 316.

Further in the example of FIG. 3, Storage Sub-Group 2 322 is made up of a contiguous set of blocks on each one of the hard disks in the Group of Hard Disks 300 that are located in the range of blocks from LBA L through LBA (2L−1). Accordingly, Storage Sub-Group 2 322 includes the blocks of storage contained from LBA L through LBA (2L−1) on each one of Disk 0 302, Disk 1 304, Disk 2 306, Disk 3 308, Disk 4 310, Disk 5 312, Disk 6 314, and so on through Disk N−1 316.

The correspondence shown in FIG. 3 between individual ones of Storage Sub-Groups 318 and corresponding unique ranges of blocks in LBA Ranges 326 continues through the last storage sub-group, e.g. Storage Sub-Group M 324, which is made up a contiguous set of blocks on each one of the hard disks in the Group of Hard Disks 300 that are located in the range of blocks from LBA L×M through LBA X, where LBA X is the block having the largest logical block address in each one of the hard disk drives in the Group of Hard Disk Drives 300. Accordingly, Storage Sub-Group M 324 includes the blocks of storage from LBA L×M through LBA X on each one of Disk 0 302, Disk 1 304, Disk 2 306, Disk 3 308, Disk 4 310, Disk 5 312, Disk 6 314, and so on through Disk N−1 316.

Since each one of the storage sub-groups in Storage Sub-Groups 318 contains L blocks of storage on each one of the hard disk drives in the Group of Hard Disk Drives 300, and the Group of Hard Disk Drives 300 contains N hard disk drives, the total number of blocks contained in each one of the storage sub-groups in Storage Sub-Groups 318 is L×N.

For purposes of explanation herein, the size of each block may be the size of the smallest allocatable unit of storage, such as 8 KB, for example. Other specific block sizes may be used in the alternative.

Figure 4:
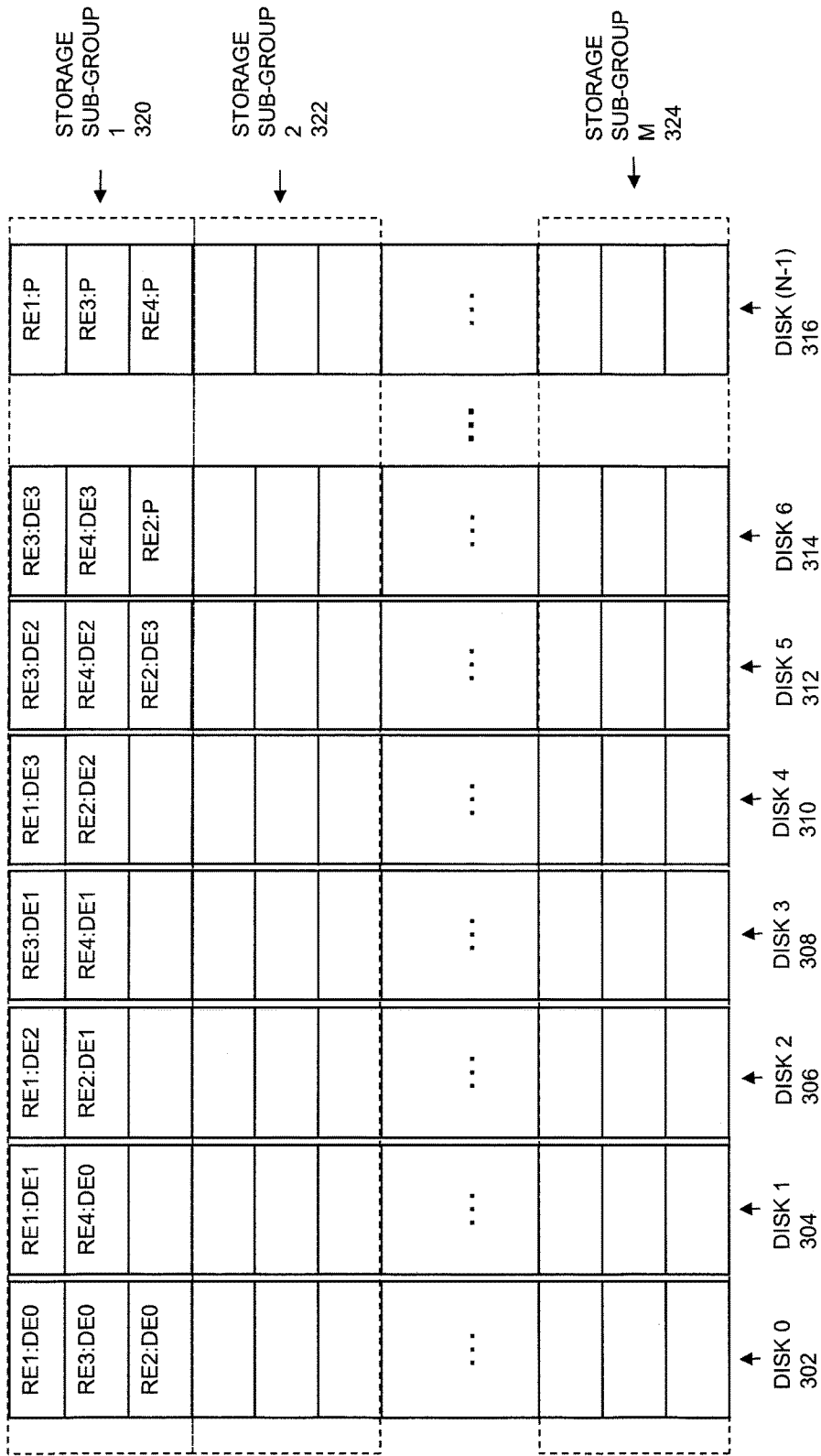
FIG. 4 is a block diagram showing an example of allocation of drive extents from a storage sub-group to specific RAID extents of a RAID mapping table sub-group in some embodiments.

FIG. 4 is a block diagram showing an illustrative example of allocation of drive extents from a storage group, e.g. Storage Sub-Group 1 320, to a number of specific RAID extents in a RAID mapping table. In the example of FIG. 4, drive extents are allocated from Storage Sub-Group 1 320 to four different RAID extents, specifically a first RAID extent RE1, a second RAID extent RE2, a third RAID extent RE3, and a fourth RAID extent RE4. Each one of the RAID extents indicates four drive extents that store host data, e.g. DE0, DE1, DE2, and DE3, and a fifth drive extent that stores parity information, e.g. P. The four RAID extents RE1, RE2, RE3 and RE4 may, for example, be contained in or make up a RAID mapping table sub-group of RAID extents that is assigned to Storage Sub-Group 1 320. Accordingly, the drive extents allocated to and indicated by the RAID extents RE1, RE2, RE3 and RE4 are all allocated from and contained in Storage Sub-Group 1 320. For purposes of illustration in FIG. 4, the drive extents allocated to and indicated by first RAID extent RE1 are shown by RE1:D0 (the first drive extent in Disk 0 302), RE1:D1 (the first drive extent in Disk 1 304), RE1:D2 (the first drive extent in Disk 2 306), RE1:D3 (the first drive extent in Disk 4 310), and RE1:P (the first drive extent in Disk N−1 316). The drive extents allocated to and indicated by the second RAID extent RE2 are shown as RE2:D0 (the third drive extent in Disk 0 302), RE2:D1 (the second drive extent in Disk 2 306), RE2:D2 (the second drive extent in Disk 4 310), RE2:D3 (the third drive extent in Disk 5 312), and RE2:P (the third drive extent in Disk 6 314). The drive extents allocated to and indicated by the third RAID extent RE3 are shown by RE3:D0 (the second drive extent in Disk 0 312), RE3:D1 (the first drive extent in Disk 3 308), RE3:D2 (the first drive extent in Disk 5 312), RE3:D3 (the first drive extent in Disk 6 314), and RE3:P (the second drive extent in Disk N−1. And finally, the RAID extents allocated to and indicated by the fourth RAID extent RE4 are shown by RE4:D0 (the second drive extent in Disk 1 304), RE4:D1 (the second drive extent in Disk 3 308), RE4:D2 (the second drive extent in Disk 5 312), RE4:D3 (the second drive extent in Disk 6 314), and RE4:P (the third drive extent in Disk N−1 316).

Figure 5:
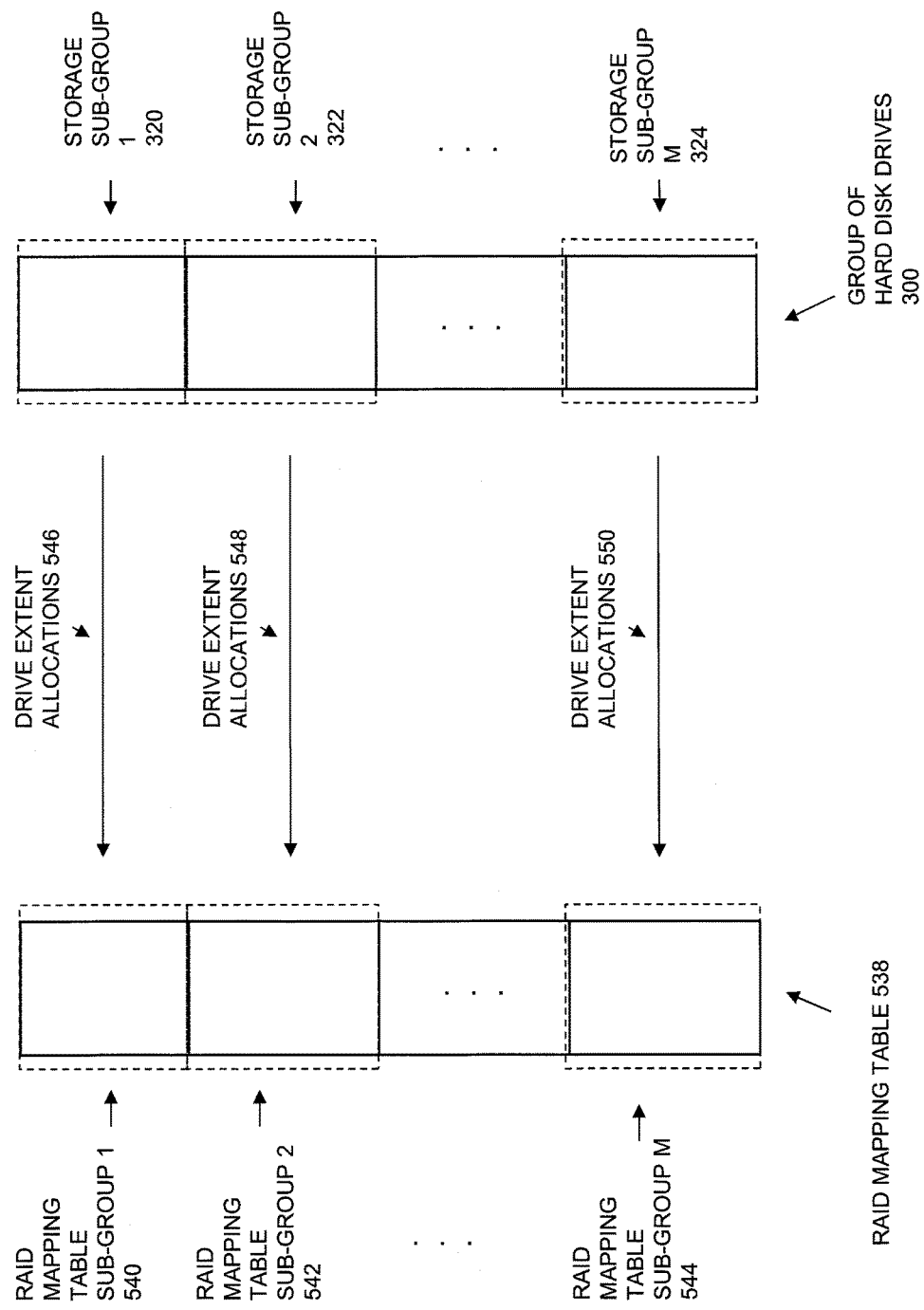
FIG. 5 is a block diagram showing an example of allocation of drive extents from storage sub-groups in a group of hard disk drives to corresponding RAID mapping table sub-groups of RAID extents in some embodiments.

FIG. 5 is a block diagram showing an example of allocation of drive extents from a number of storage sub-groups created in a Group of Hard Disk Drives 300 to corresponding RAID mapping table sub-groups of RAID extents created in a RAID Mapping Table 538. As shown in the example of FIG. 5, RAID Mapping Table Sub-Group 1 540 is assigned to Storage Sub-Group 1 320, RAID Mapping Table Sub-Group 2 542 is assigned to Storage Sub-Group 2 322, and so on through RAID Mapping Table Sub-Group M 544, which is assigned to Storage Sub-Group M 324. All drive extents allocated to RAID extents in RAID Mapping Table Sub-Group 1 540 are allocated from Storage Sub-Group 1 320, as shown by Drive Extent Allocations 546. All drive extents allocated to RAID extents in RAID Mapping Table Sub-Group 2 542 are allocated from Storage Sub-Group 2 322, as shown by Drive Extent Allocations 548. Drive extents are similarly allocated to RAID extents in other RAID mapping table sub-groups in RAID Mapping Table 538, through the drive extents allocated to RAID extents in RAID Mapping Table Sub-Group M 544, which are all allocated from Storage Sub-Group M 324, as shown by Drive Extent Allocations 550.

Figure 6:
FIG. 6 is a block diagram showing an example of a neighborhood matrix generated for a group of hard disk drives in some embodiments.

FIG. 6 is a block diagram showing an example of a Neighborhood Matrix 600 ("NM") generated by RAID Mapping Logic 136 and stored in Memory 126 in some embodiments. Each element NM(i,j) in Neighborhood Matrix 600 corresponds to a pair of hard disk drives in a group of hard disk drives (e.g. Group of Hard Disk Drives 130 shown in FIG. 1), where i indicates a first one of the hard disk drives in the pair, and j indicates a second one of the hard disk drives in the pair. The group of hard disk drives in the example of FIG. 6 contains four hard disk drives, numbered 0 through 3, though any specific size of group and numbering may be used in the alternative. Each element in Neighborhood Matrix 600 stores a value equal to a total number of individual RAID extents in a corresponding RAID mapping table (e.g. RAID Mapping Table 138) that each indicate both i) at least one drive extent located on a first one of the hard disk drives in the corresponding pair of hard disk drives (e.g. hard disk drive "i"), and ii) at least one drive extent located on a second one of the hard disk drives in the corresponding pair of hard disk drives (e.g. hard disk drive "j").

For example, the value of each element NM(i,j) in Neighborhood Matrix 600 is equal to the total number of RAID extents in RAID Mapping Table 138 that indicate both at least one drive extent located on a hard disk drive i contained within the Group of Hard Disk Drives 130 and at least one drive extent located on a hard disk drive j contained within the Group of Hard Disk Drives 130, where i and j vary between 0 and 3, since the hard disk drives in the group of hard disk drives in the example of FIG. 6 are hard disk drives numbered 0 through 3. In this way, each element in NM(i,j) indicates how many times hard disk drive i is a "neighbor" to hard disk drive j within a RAID extent. It should be recognized that the Neighborhood Matrix 600 is a symmetric matrix, in that the value of NM(i,j) is equal to the value of NM(j,i), and that the diagonal elements in which i equals j may have a value of 0, since a physical data storage drive cannot be a neighbor to itself, and may be set to zero. The values of NM(0,0), NM(1,1), NM(2,2), and NM(3,3) may accordingly be zero.

Further in the example of FIG. 6, the value of NM(1,0) (and the value of NM(0,1)) is equal to the total number of RAID extents in the RAID mapping table that indicate both at least one drive extent located on hard disk drive 1 and at least one drive extent located on hard disk drive 0. The value of NM(2,0) (and the value of NM(0,2)) is equal to the total number of RAID extents in the RAID mapping table that indicate both at least one drive extent located on hard disk drive 2 and at least one drive extent located on hard disk drive 0. The value of NM(3,0) (and the value of NM(0,3)) is equal to the total number of RAID extents in the RAID mapping table that indicate both at least one drive extent located on hard disk drive 3 and at least one drive extent located on hard disk drive 0. The value of NM(2,1) (and the value of NM(1,2)) is equal to the total number of RAID extents in the RAID mapping table that indicate both at least one drive extent located on hard disk drive 2 and at least one drive extent located on hard disk drive 1. The value of NM(3,1) (and the value of NM(1,3)) is equal to the total number of RAID extents in the RAID mapping table that indicate both at least one drive extent located on hard disk drive 3 and at least one drive extent located on hard disk drive 1. The value of NM(3,2) (and the value of NM(2,3)) is equal to the total number of RAID extents in the RAID mapping table that indicate both at least one drive extent located on hard disk drive 3 and at least one drive extent located on hard disk drive 2.

Figure 7:
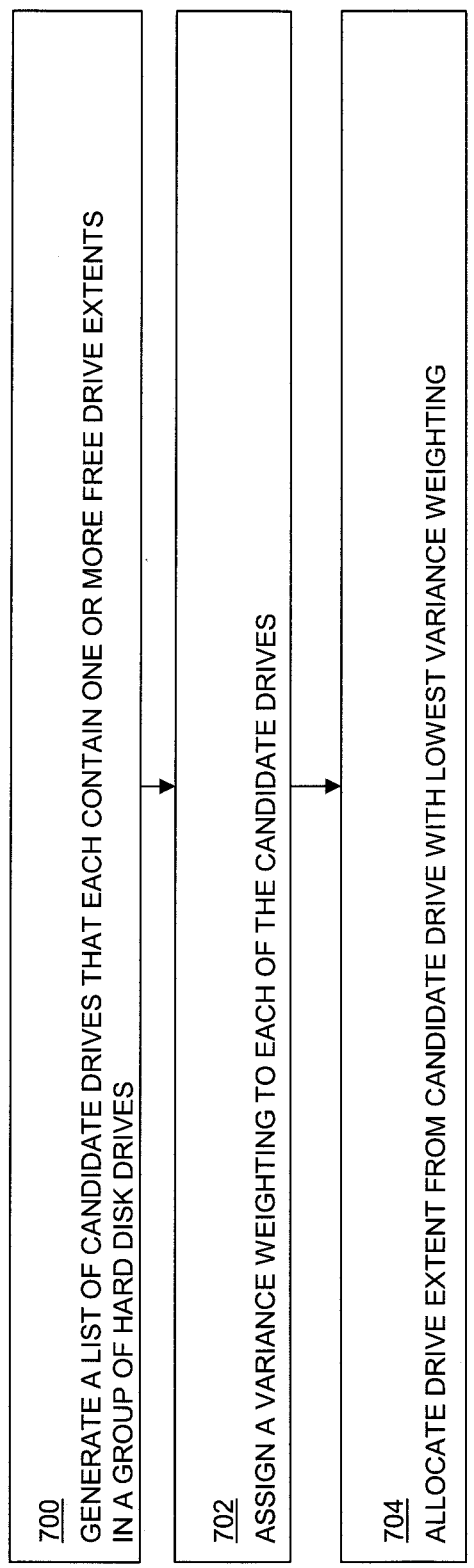
FIG. 7 is a flow chart showing an example of steps performed in some embodiments to allocate, to a RAID extent in a RAID mapping table, a drive extent from the free drive extents located on hard disk drives in a group of hard disk drives.

FIG. 7 is a flow chart showing an example of steps performed in some embodiments by RAID Mapping Logic 136 to allocate a drive extent from the free drive extents located on hard disk drives in a group of hard disk drives, e.g. from Free Drive Extents 133 in Drive Extent Pool 134 to one of the RAID extents in RAID Mapping Table 138. The steps of FIG. 7 may, for example, be performed each time a drive extent is allocated to a RAID extent in RAID Mapping Table 138.

At step 700, a list of candidate drives is generated. The list of candidate drives consists of those hard disk drives in the group of hard disk drives that each have located on them at least one free drive extent. At step 702, a variance weighting is assigned to each candidate drive in the list of candidate drives. The variance weighting for a given one of the candidate drives is calculated as the variance of the values in the elements of the neighborhood matrix for the group of hard disk drives, as modified to reflect an allocation of a drive extent from that candidate drive to the RAID extent. For example, in an operational example in which hard disk drives 0 and 1 each have located thereon at least one free drive extent, the candidate list would include hard disk drives 0 and 1. The variance weighting for hard disk drive 0 would be equal to the variance of the values in the neighborhood matrix for the group of hard disk drives, albeit modified to reflect allocation of a drive extent from hard disk drive 0 to the RAID extent. Similarly, the variance weighting for hard disk drive 1 would be equal to the variance of the values of the elements in the neighborhood matrix for the group of hard disk drives, albeit alternatively modified to reflect allocation of a drive extent from hard disk drive 1 to the RAID extent.

The variance of the elements in the neighborhood matrix may be calculated using conventional techniques for calculating a variance. For example, for a neighborhood matrix for a group of hard disk drives that contains N+1 hard disk drives, variance across the values of the neighborhood matrix may be calculated as follows:

$$\overline{NM} = \left( \sum_{\substack{i=0 \\ j=0}}^{N} NM(i, j) \right) / N^2$$

-continued $$\text{variance} = \left( \sum_{\substack{i=0 \\ j=0}}^{N} (NM(i,j) - \overline{NM})^2 \right) / N^2$$

At step 704 a drive extent is allocated from the hard disk drive in the candidate list having the lowest variance weighting. An indication of the allocated drive extent may then be added to the RAID extent. The neighborhood matrix for the group of hard disk drives may then be modified to reflect the addition of the indication of the allocated drive to the RAID extent. By allocating a drive extent from the hard disk drive in the candidate list that has the lowest variance weighting, embodiments of the disclosed technology may advantageously maintain a relatively "flat" set of values in the elements of the neighborhood matrix, in order to provide a high level of disk drive rebuild performance by ensuring that RAID extents are evenly distributed across the hard disk drives in the group of hard disk drives, so that large numbers of hard disk drives are able to concurrently participate in the drive rebuilding process in the event of a drive failure in the group of hard disk drives. See also FIG. 9.

Figure 8:
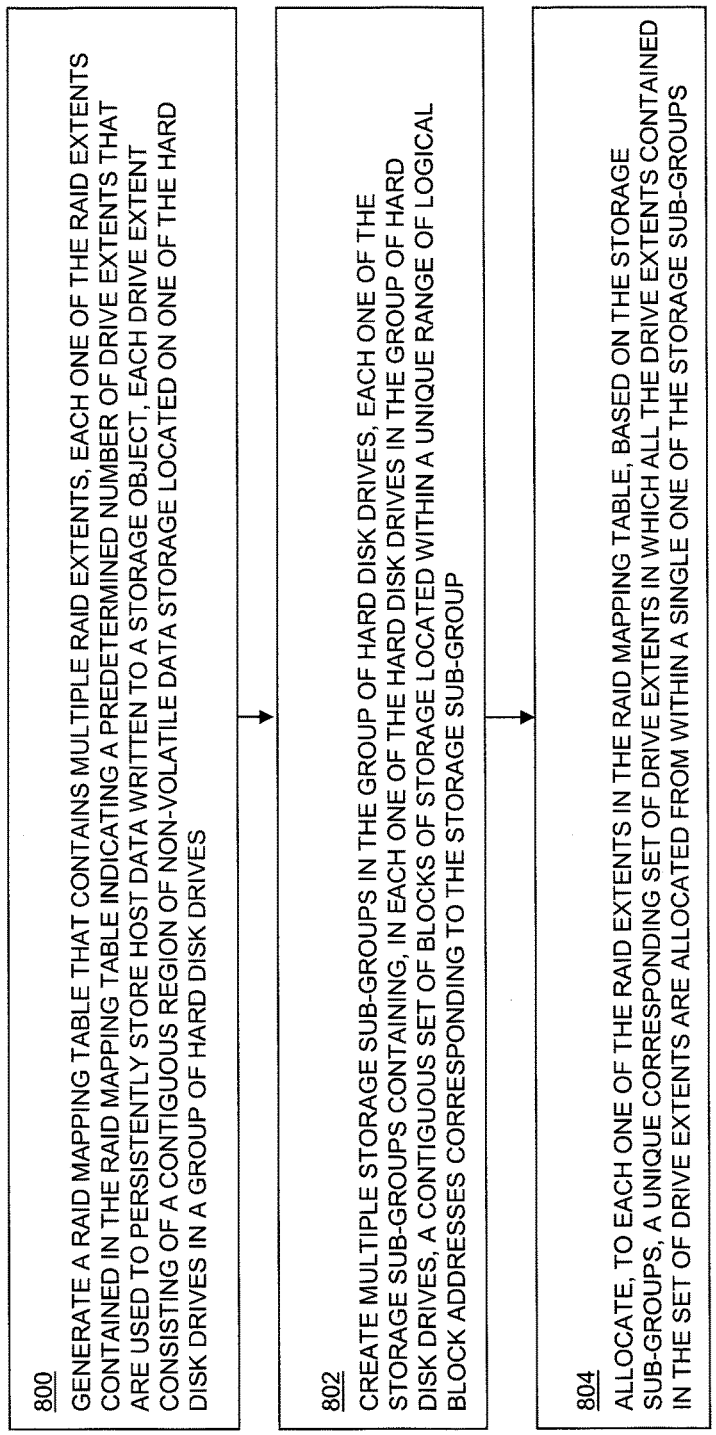
FIG. 8 is a flow chart showing an example of steps performed in some embodiments to provide mapped RAID with drive extents that are allocated to individual RAID extents in a RAID mapping table from within individual sub-groups of storage that are each made up of a range of logical block addresses defined across a group of hard disk drives.

FIG. 8 is a flow chart showing an example of steps performed in some embodiments by RAID Mapping Logic 136 to provide mapped RAID with drive extents that are allocated to individual RAID extents in a RAID mapping table from within individual sub-groups of storage that are each made up of a range of logical block addresses defined across a group of hard disk drives. At step 800, a RAID mapping table is generated that contains multiple RAID extents. Each one of the RAID extents contained in the RAID mapping table indicates a predetermined number of drive extents that are used to persistently store host data written to a storage object, such as a LUN. Each drive extent consists of a contiguous region of non-volatile data storage located on one of the hard disk drives in a group of hard disk drives.

At step 802, multiple storage sub-groups are created in the group of hard disk drives. Each one of the storage sub-groups contains, in each one of the hard disk drives in the group of hard disk drives, a contiguous set of blocks of storage located within a unique range of logical block addresses corresponding to the storage sub-group.

At step 804, drive extents are allocated based on the storage sub-groups, such that for each one of the RAID extents in the RAID mapping table, a unique corresponding set of drive extents is allocated in which all the drive extents contained in the set of drive extents are allocated from within a single one of the storage sub-groups.

Figure 9:
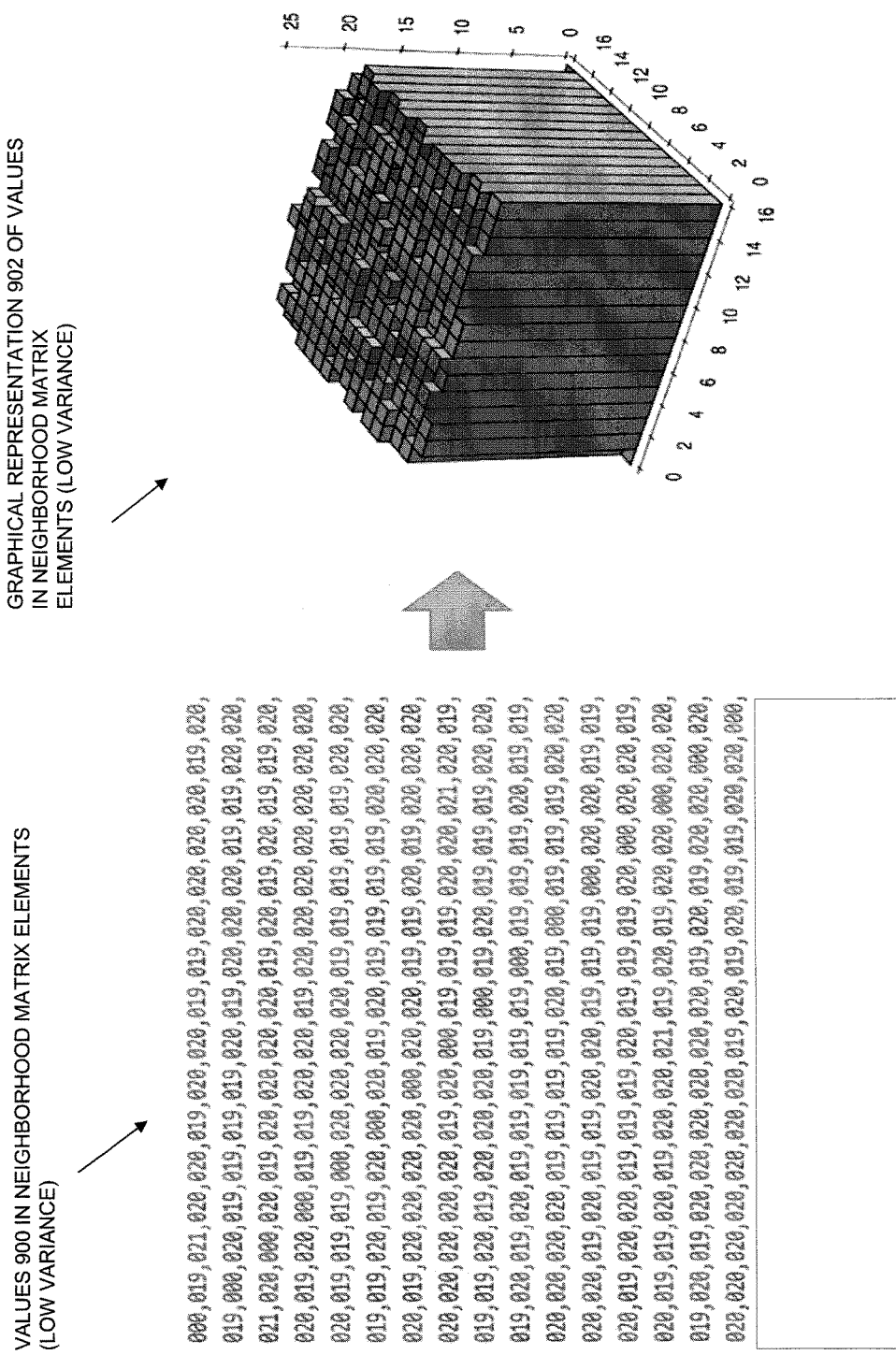
FIG. 9 shows an example of values in a neighborhood matrix for a group of hard disk drives, in which the values of the neighborhood matrix advantageously have a low variance, and a graphical representation of the those values, as may be generated and maintained using some embodiments of the disclosed techniques.

FIG. 9 shows an example of Values 900 in a neighborhood matrix for a group of hard disk drives, in which the values of the neighborhood matrix have a low variance, and a Graphical Representation 902 of the those values. A neighborhood matrix with values having a low variance may advantageously be provided using some embodiments of the disclosed techniques.

In the example of FIG. 9, the group of hard disk drives corresponding to the Values 900 and the Graphical Representation 902 has, for purposes of illustration and explanation, 16 physical data storage drives. The Graphical Representation 902 visually shows that when the values in the elements of a neighborhood matrix have a low variance, then the values of the corresponding graphical representation are significantly "flat". In some embodiments, while allocating drive extents to the RAID extents in a RAID mapping table, some embodiments of the disclosed techniques may allocate at least one drive extent such that a resulting variance in the values of the elements in a neighborhood matrix for the group of hard disk drives is kept low, as described herein. As a result, some embodiments of the disclosed technology may provide a high level of disk drive rebuild performance by ensuring that RAID extents are evenly distributed across the hard disk drives in the group of hard disk drives, so that large numbers of hard disk drives are able to concurrently participate in the drive rebuilding process in the event of a drive failure in the group of hard disk drives.

Figure 10:
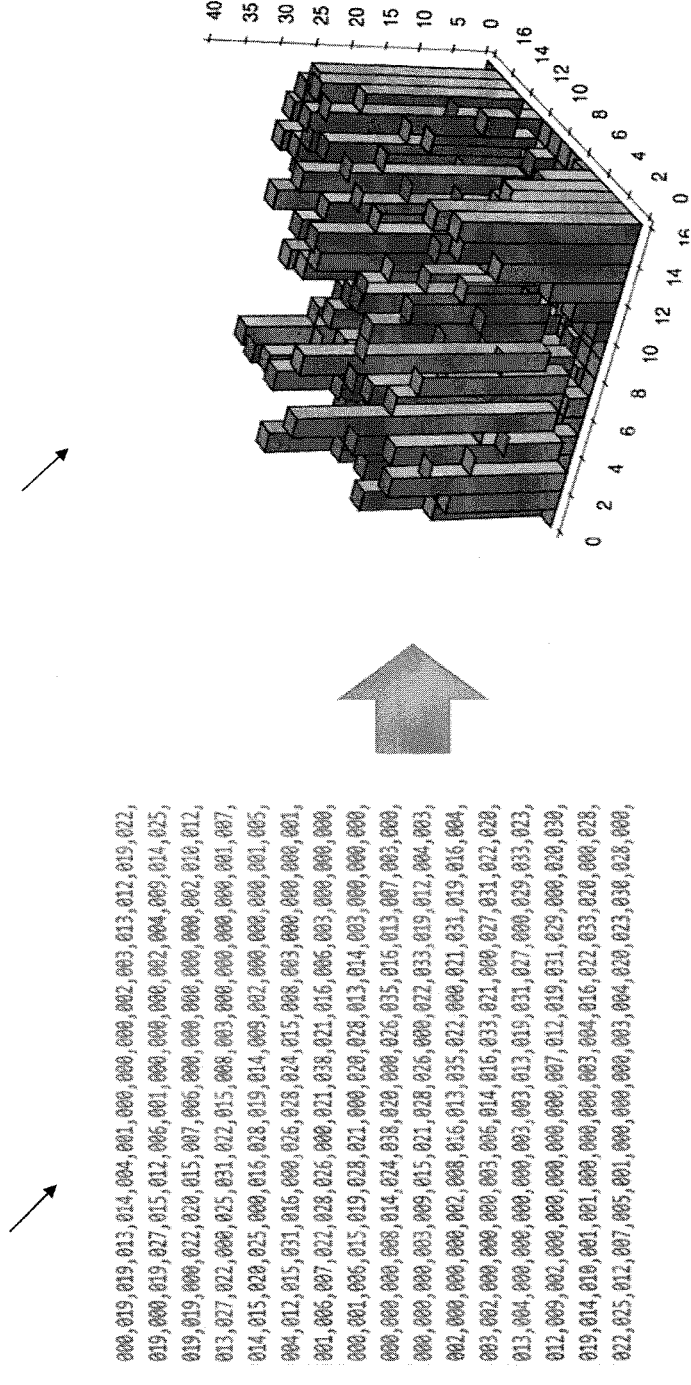
FIG. 10 shows an example of values in a neighborhood matrix for a group of hard disk drives, contrasting with the values shown in FIG. 9, in which the values of the neighborhood matrix have a high variance, and a graphical representation of those values.

In contrast to FIG. 9, FIG. 10 shows an example of Values 1000 in elements of a neighborhood matrix having a high variance, and a Graphical Representation 1002 of the Values 1000. The group of hard disk drives corresponding to the Values 1000 and the Graphical Representation 1002 also has, for example, 16 hard disk drives. The Graphical Representation 1002 illustrates that when the values in the elements of a neighborhood matrix are allowed to have a high variance, then the corresponding graphical representation is not visually "flat". Without using the techniques disclosed for some embodiments herein while allocating drive extents to RAID extents in a RAID mapping table, drive extents may be allocated such that a resulting variance in the values of the elements in the neighborhood matrix for the underlying group of hard disk drives is high, as illustrated in the example of FIG. 10. A low level of disk drive rebuild performance may accordingly result, because smaller numbers of storage drives are able to participate in the drive rebuilding process in the event of a drive failure in the group of hard disk drives.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and a group of hard disk drives communicably coupled to the storage processor, the method comprising:
    generating a RAID mapping table, wherein the RAID mapping table contains a plurality of RAID extents, wherein each RAID extent contained in the RAID mapping table indicates a predetermined number of drive extents that are used to persistently store host data written to the storage object, and wherein each drive extent comprises a contiguous region of non-volatile data storage located on one of the hard disk drives, wherein each one of the RAID extents in the RAID mapping table indicates the same predetermined total number of drive extents;
    creating, in the group of hard disk drives, a plurality of storage sub-groups, wherein each one of the storage sub-groups contains, in each one of the hard disk drives in the group of hard disk drives, a contiguous set of blocks of storage located within a unique range of logical block addresses corresponding to the storage sub-group; and
    allocating, to each one of the RAID extents in the RAID mapping table, and based on the created storage sub-groups, a unique corresponding set of drive extents in which all drive extents contained in the set of drive extents are allocated from within a single one of the storage sub-groups, wherein allocating a unique corresponding set of drive extents to each one of the RAID extents in the RAID mapping table includes calculating a RAID mapping table sub-group size, and wherein the value of the RAID mapping table sub-group size has a value that is at least as large as the result of dividing i) a total number of hard disk drives contained in the group of hard disk drives, by ii) the number of drive extents indicated by each one of the RAID extents in the RAID mapping table.

2. The method of claim 1, wherein allocating a unique corresponding set of drive extents to each one of the RAID extents in the RAID mapping table further includes:
    dividing the RAID mapping table into a plurality of RAID mapping table sub-groups, wherein each RAID mapping table sub-group is made up of a unique set of consecutively located RAID extents, wherein each set of consecutively located RAID extents comprises a total number of RAID extents equal to the RAID mapping table sub-group size; and
    assigning each RAID mapping table sub-group in the RAID mapping table to a corresponding one of the storage sub-groups.

3. The method of claim 2, wherein creating the storage sub-groups includes calculating a storage sub-group size, wherein the storage sub-group size is equal to a multiple of a product of i) the RAID mapping table sub-group size, and ii) the predetermined number of drive extents indicated by each one of the RAID extents in the RAID mapping table; and
    wherein each storage sub-group contains a total number of drive extents that is equal to the storage sub-group size.

4. The method of claim 3, wherein allocating a unique corresponding set of drive extents to each one of the RAID extents in the RAID mapping table includes allocating higher performing drive extents from the group of hard disk drives before allocating lower performing drive extents from the group of hard disk drives by allocating drive extents from storage sub-groups having lower corresponding ranges of logical block addresses before allocating drive extents from storage sub-groups having higher corresponding ranges of logical block addresses.

5. The method of claim 4, wherein allocating a unique corresponding set of drive extents to each one of the RAID extents in the RAID mapping table includes allocating all drive extents such that for each RAID mapping table sub-group no drive extent is allocated to any RAID extent contained in the RAID mapping table sub-group that is located on the same hard disk drive as any other drive extent allocated to any other RAID extent contained in the RAID mapping table sub-group.

6. The method of claim 5, wherein allocating a unique corresponding set of drive extents to each one of the RAID extents in the RAID mapping table includes:
    generating a neighborhood matrix for the group of hard disk drives, wherein each element in the neighborhood matrix for the group of hard disk drives corresponds to a pair of drives contained in the group of hard disk drives and stores a value equal to a total number of RAID extents in the RAID mapping table that indicate both i) at least one drive extent located on a first one of the drives in the pair of drives corresponding to the element, and ii) at least one drive extent located on a second one of the drives in the pair of drives corresponding to the element; and,
    allocating each drive extent contained in the set of drive extents by:
        i) generating a list of candidate drives contained in the group of hard disk drives, wherein each one of the candidate drives has located thereon at least one free drive extent, ii) assigning, to each one of the candidate drives, a variance weighting that is equal to a variance of the values of the elements in the neighborhood matrix for the group of hard disk drives resulting from modifying the neighborhood matrix to indicate that the drive extent was allocated from the candidate drive, iii) selecting one of the candidate drives having a lowest assigned variance weighting, and iv) allocating the drive extent from the candidate drive having the lowest assigned variance weighting.

7. The method of claim 6, wherein drive extents are allocated to RAID extents in the RAID mapping table such that no two drive extents indicated by any single RAID extent are located on the same hard disk drive.

8. A data storage system that provides RAID (Redundant Array of Independent Disks) data protection for a storage object, comprising:

at least one storage processor including processing circuitry and a memory;

a set of hard disk drives communicably coupled to the storage processor; and wherein the memory has program code stored thereon, wherein the program code, when executed by the processing circuitry, causes the processing circuitry to:

generate a RAID mapping table in the memory, wherein the RAID mapping table contains a plurality of RAID extents, wherein each RAID extent contained in the RAID mapping table indicates a predetermined number of drive extents that are used to persistently store host data written to the storage object, wherein each drive extent comprises a contiguous region of non-volatile data storage located on one of the hard disk drives, and wherein each one of the RAID extents in the RAID mapping table indicates the same predetermined total number of drive extents, create, in the group of hard disk drives, a plurality of storage sub-groups, wherein each one of the storage sub-groups contains, in each one of the hard disk drives in the group of hard disk drives, a contiguous set of blocks of storage located within a unique range of logical block addresses corresponding to the storage sub-group, and allocate, to each one of the RAID extents in the RAID mapping table, and based on the created storage sub-groups, a unique corresponding set of drive extents in which all drive extents contained in the set of drive extents are allocated from within a single one of the storage sub-groups, at least in part by causing the processing circuitry to calculate a RAID mapping table sub-group size, wherein the value of the RAID mapping table sub-group size has a value that is at least as large as the result of dividing i) a total number of hard disk drives contained in the group of hard disk drives, by ii) the number of drive extents indicated by each one of the RAID extents in the RAID mapping table.

9. The data storage system of claim 8, wherein the program code, when executed by the processing circuitry, causes the processing circuitry to allocate a unique corresponding set of drive extents to each one of the RAID extents in the RAID mapping table at least in part by causing the processing circuitry to:

divide the RAID mapping table into a plurality of RAID mapping table sub-groups, wherein each RAID mapping table sub-group is made up of a unique set of consecutively located RAID extents, wherein each set of consecutively located RAID extents comprises a total number of RAID extents equal to the RAID mapping table sub-group size; and assign each RAID mapping table sub-group in the RAID mapping table to a corresponding one of the storage sub-groups.

10. The data storage system of claim 9, wherein the program, when executed by the processing circuitry, causes the processing circuitry to create the storage sub-groups at least in part by causing the processing circuitry to calculate a storage sub-group size, wherein the storage sub-group size is equal to a multiple of a product of i) the RAID mapping table sub-group size, and ii) the predetermined number of drive extents indicated by each one of the RAID extents in the RAID mapping table; and wherein each storage sub-group contains a total number of drive extents that is equal to the storage sub-group size.

11. The data storage system of claim 10, wherein the program code, when executed by the processing circuitry, causes the processing circuitry to allocate a unique corresponding set of drive extents to each one of the RAID extents in the RAID mapping table at least in part by causing the processing circuitry to allocate higher performing drive extents from the group of hard disk drives before lower performing drive extents are allocated from the group of hard disk drives by causing the processing circuitry to allocate drive extents from storage sub-groups having lower corresponding ranges of logical block addresses before drive extents are allocated from storage sub-groups having higher corresponding ranges of logical block addresses.

12. The data storage system of claim 11, wherein the program code, when executed by the processing circuitry, causes the processing circuitry to allocate a unique corresponding set of drive extents to each one of the RAID extents in the RAID mapping table at least in part by causing the processing circuitry to allocate all drive extents such that for each RAID mapping table sub-group no drive extent is allocated to any RAID extent contained in the RAID mapping table sub-group that is located on the same hard disk drive as any other drive extent allocated to any other RAID extent contained in the RAID mapping table sub-group.

13. The data storage system of claim 12, wherein the program code, when executed by the processing circuitry, causes the processing circuitry to allocate a unique corresponding set of drive extents to each one of the RAID extents in the RAID mapping table at least in part by causing the processing circuitry to:

generate a neighborhood matrix for the group of hard disk drives, wherein each element in the neighborhood matrix for the group of hard disk drives corresponds to a pair of drives contained in the group of hard disk drives and stores a value equal to a total number of RAID extents in the RAID mapping table that indicate both i) at least one drive extent located on a first one of the drives in the pair of drives corresponding to the element, and ii) at least one drive extent located on a second one of the drives in the pair of drives corresponding to the element; and, allocate each drive extent contained in the set of drive extents by causing the processing circuitry to:

i) generate a list of candidate drives contained in the group of hard disk drives, wherein each one of the candidate drives has located thereon at least one free drive extent, ii) assign, to each one of the candidate drives, a variance weighting that is equal to a variance of the values of the elements in the neighborhood matrix for the group of hard disk drives resulting from modifying the neighborhood matrix to indicate that the drive extent was allocated from the candidate drive, iii) select one of the candidate drives having a lowest assigned variance weighting, and iv) allocate the drive extent from the candidate drive having the lowest assigned variance weighting.

14. The data storage system of claim 13, wherein drive extents are allocated to RAID extents in the RAID mapping table such that no two drive extents indicated by any single RAID extent are located on the same hard disk drive.

15. A non-transitory computer readable medium for providing RAID (Redundant Array of Independent Disks) data protection for a storage object, comprising instructions stored thereon, that when executed on processing circuitry in a storage processor, perform the steps of:

generating a RAID mapping table, wherein the RAID mapping table contains a plurality of RAID extents, wherein each RAID extent contained in the RAID mapping table indicates a predetermined number of drive extents that are used to persistently store host data written to the storage object, and wherein each drive extent comprises a contiguous region of non-volatile data storage located on one of the hard disk drives, wherein each one of the RAID extents in the RAID mapping table indicates the same predetermined total number of drive extents;

creating, in the group of hard disk drives, a plurality of storage sub-groups, wherein each one of the storage sub-groups contains, in each one of the hard disk drives in the group of hard disk drives, a contiguous set of blocks of storage located within a unique range of logical block addresses corresponding to the storage sub-group; and allocating, to each one of the RAID extents in the RAID mapping table, and based on the created storage sub-groups, a unique corresponding set of drive extents in which all drive extents contained in the set of drive extents are allocated from within a single one of the storage sub-groups, wherein allocating a unique corresponding set of drive extents to each one of the RAID extents in the RAID mapping table includes calculating a RAID mapping table sub-group size, and wherein the value of the RAID mapping table sub-group size has a value that is at least as large as the result of dividing i) a total number of hard disk drives contained in the group of hard disk drives, by ii) the number of drive extents indicated by each one of the RAID extents in the RAID mapping table.

* * * * *